ND

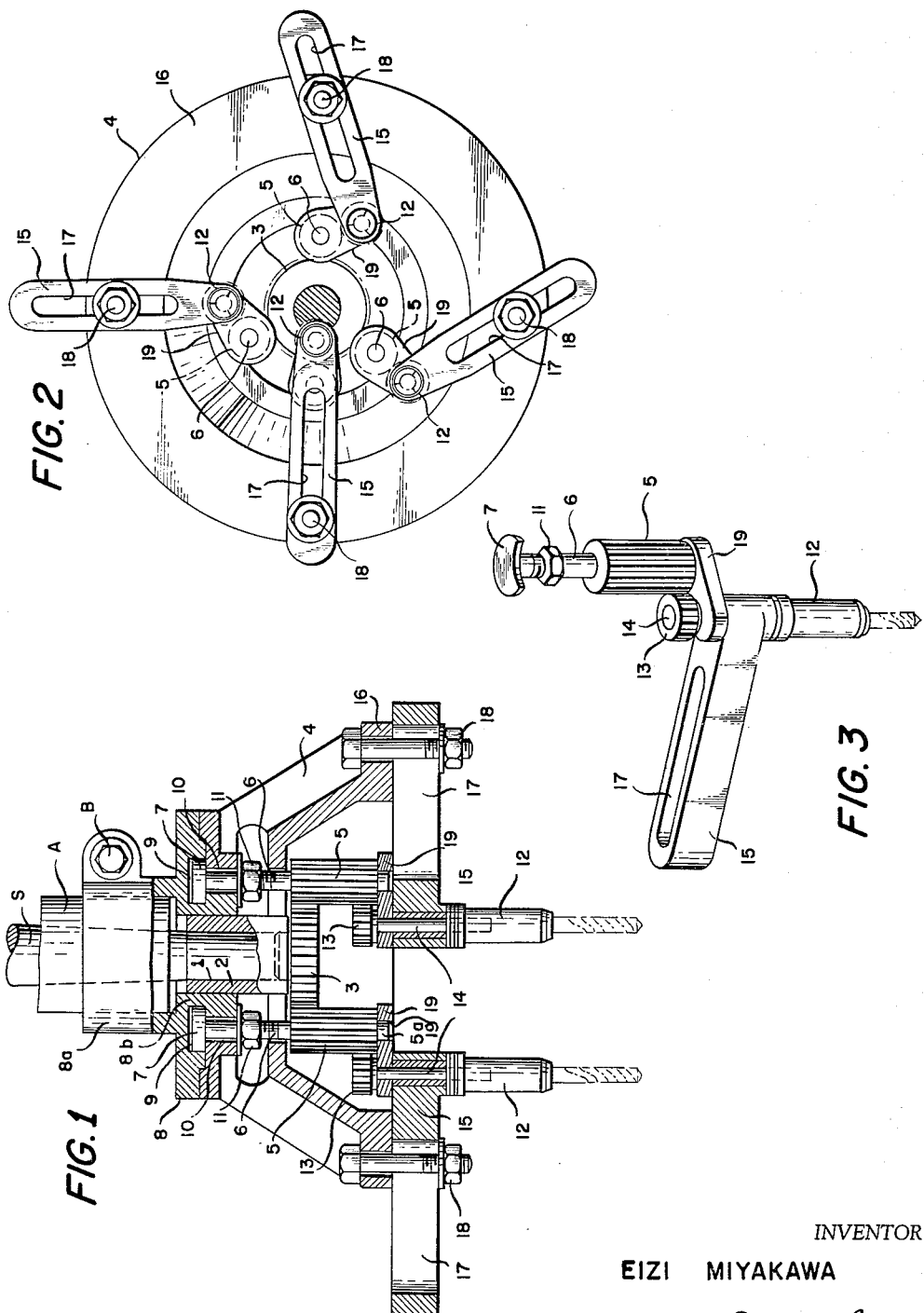

United States Patent Office 3,215,005
Patented Nov. 2, 1965

3,215,005
MULTIPLE SPINDLE DRILLING MACHINE WITH ADJUSTABLE SPINDLES
Eizi Miyakawa, Daimoncho 3–48, Seki, Japan
Filed Nov. 13, 1964, Ser. No. 410,925
2 Claims. (Cl. 77—24)

The present invention relates to an apparatus for drilling a plurality of holes at the same time and in which there are a plurality of spindles driven from a central shaft and which are adjustable radially and circumferentially of the central shaft.

Heretofore there has been such a drilling apparatus but in which the drive has been transferred from a central gear to smaller planetary gears on shafts leading to universal joints, which in turn have spindles with drills thereon. However, in such devices, vibrations in the apparatus are apt to be concentrated at the tip of the drill and cause deflections of the drill, thereby twisting it and often damaging it. Moreover, the farther away from the central shaft the drill spindles are positioned, the higher the ends of the drills must be raised, so that the thickness of the materials which can be handled in the drilling apparatus is restricted. In addition, such an apparatus is expensive to manufacture. Because of these limitations, this type of apparatus is not popular.

It is an object of the present invention to provide a multiple spindle drilling apparatus which is free of the limitations and drawbacks of the prior art devices of this type.

It is a further object of the present invention to provide a multi-spindle drilling apparatus which has the spindles thereof adjustable yet which can carry out drilling operations smoothly, correctly and exactly without deflections of the drills.

It is a still further object of this invention to provide a multiple spindle drilling apparatus in which power is transmitted directly to the drill spindles through gearing, yet in which the drill spindles can be adjusted radially and circumferentially of the central axis of the apparatus.

Other and further objects of the invention will become apparent from the following specification and claims, taken together with the accompanying drawings, in which:

FIG. 1 is a sectional elevation view of the drilling apparatus according to the present invention;

FIG. 2 is a bottom plan view of the apparatus of FIG. 1; and

FIG. 3 is a perspective view of a holding arm and a drill spindle of the apparatus of FIG. 1.

As seen in the figures, there is mounted on the lower end of a main spindle S of a drilling machine or a tapping machine a cylindrical sleeve 2 having a central or sun gear 3 on the lower end thereof. The end of the main spindle is fixed in the bore 1 of the sleeve 2. Positioned around the central gear 3 is a plurality of intermediate or planet gears 5 which are axially elongated and which are engaged with the central gear 3. The lower end of each intermediate gear 5 has an axial pin 5a thereon which is engaged in a guide hole 19a in connecting plate 19, and the upper end of each gear 5 has an axial shaft 6 extending therefrom which is threaded intermediate the ends thereof and which has a head 7 on the upper end thereof which is larger in diameter than the shaft 6. A nut 11 is threaded on the threaded portion of the shaft 6.

A frame 4 surrounds the central gear 3 with its sleeve 2 being rotatable within the frame, and the frame also surrounds the gears 5 and the shafts 6, and extends downwardly and outwardly from the central gear 3. A cover plate 8 is mounted on the top of the frame 4 and has a circular recess 9 therein slightly larger than the heads 7 on the upper ends of the shafts 6 and has an inner cylindrical portion 8b smaller in outside diameter than the inside diameter of frame 4. The cover plate is secured to the top of the frame by means not shown so that the recess defines a space in which the heads 7 are positioned and the inner cylindrical portion 8b is spaced from the frame 4 to define a circular groove 10 through which shafts 6 extend to recess 9 and along which the shafts 6 can be moved circumferentially of the frame. The nuts 11 on the shafts can be threaded up and down the threaded portions of the shafts to tighten the heads 7 down against the top of the frame 4 and hold the inner cylindrical portion of the cover plate 8 tightly between the nuts 11 and the heads 7, thereby holding it on the frame 4. Extending upwardly from the top of the cover plate 8 is a split sleeve 8a which has a bolt B therein for tightening the sleeve around a further sleeve A on the spindle S to mount the apparatus on the spindle S.

On the bottom of the frame 4 is a ring-shaped flange 16 in which are a plurality of bolts 18 with nuts on the ends thereof. The bolts extend through slots 17 in individual drill spindle holding arms 15, on the inner end of which is rotatably mounted a drill spindle 14 having a drill chuck 12 on the lower end thereof. On the upper end of each drill spindle 14 is a drill gear 13, and the spindle extends through the other end of the connecting plate 19 from the end having the pin 5a on the lower end of gear 5 therein. The gears 13 are each engaged with the lower end of a gear 5, and the axes of the spindles 14 are each spaced from the axes of the gears 5 a distance which is equal to the sum of the radius of a gear 5 and a radius of a gear 13.

In use, the usual chuck is removed from the main spindle S of a drilling or tapping machine, and the apparatus of the present invention is mounted on the spindle S by inserting the end of the spindle into the bore 1 of the sleeve 2 and slipping the split sleeve 8a around the further sleeve A on the main spindle and tightening the bolt B. The individual drill spindles are then located to drill the work in the desired locations by loosening the nuts 11 on shafts 6 and the nuts on the bolts 18 and manipulating the shafts 6 and the individual linkages consisting of the holding arm 15 and the connecting plate 19 to move the drill spindles 14 to the desired positions, and then retightening nuts 11 and the nuts on bolts 18. It will be seen that because the shafts 6, and with them the gears 5, can be moved along a circle corresponding to the groove 10, and because the gears 13 and consequently the individual drill spindles 14 can each be moved in a circular path around the axes of the shafts 6 and the gears 5, that the individual drill spindles 14 and hence the drills driven by them can be positioned anywhere within a circular band around the central gear, the inside diameter of which band is defined by the positions of the drill spindles 14 when they are radially inwardly of the gears 5 and the outside diameter of which is defined by the positions of the drill spindles 14 when they are radially outwardly of the gears 5.

It will thus be seen that regardless of the positions of the various individual drill spindles 14, power is transmitted to them through a gear train of central gear 3, intermediate gears 5, and gears 13 on the drill spindles 14. There are no universal joints, and the drills will not have vibrations concentrated at the tips thereof. The apparatus can thus bore holes accurately and smoothly. In addition, regardless of the positions of the individual drill spindles, the drill chucks 12 are at the same level with respect to the end of the main spindle, and consequently there are no restrictions on the thickness of the work which can be handled due to the necessity of raising or lowering the drills because of a change in their position. Furthermore, the parts of the apparatus are simple and relatively inexpensive to make, yet can be made sturdy and with great accuracy.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A multi-spindle drilling apparatus comprising a central gear adapted to be attached to the main spindle of a drilling machine or the like, a frame around said central gear in which said central gear is rotatably mounted, a plurality of intermediate gears positioned around and engaged with said central gear, a plurality of shafts adjustably mounted on said frame for adjusting movement on a circular path around said central shaft and on which shafts said intermediate gears are mounted, a plurality of drill gears, one engaged with each intermediate gear, a plurality of individual drill spindles on which the respective drill gears are mounted, and a plurality of individual linkages on which the respective drill spindles are rotatably mounted for moving said drill spindles in circular paths around the axes of said intermediate gears, each linkage having one end pivoted on an intermediate gear shaft and the other end adjustably pivoted on said frame, whereby the positions of said intermediate gears can be adjusted along the circular path around the central gear and the individual drill spindles can each be adjusted in a circular path around the intermediate gears so that a particular drill spindle can be positioned anywhere within a circular band around the central gear the inside diameter of which is defined by the positions of the drill spindles when they are radially inwardly of the intermediate gears and the outside diameter of which is defined by the positions of the drill spindles when they are radially outwardly of the intermediate gears.

2. A multi-spindle drilling apparatus comprising a central gear adapted to be attached to the main spindle of a drilling machine or the like, a frame around said central gear in which said central gear is rotatably mounted, a plurality of intermediate gears positioned around and engaged with said central gear, a plurality of shafts adjustably mounted on said frame for adjusting movement on a circular path around said central shaft and on which shafts said intermediate gears are mounted, a plurality of drill gears, one engaged with each intermediate gear, a plurality of individual drill spindles on which the respective drill gears are mounted, and a plurality of individual linkages on which the respective drill spindles are rotatably mounted for moving said drill spindles in circular paths around the axes of said intermediate gears, each linkage having one end pivoted on an intermediate gear shaft and the other end adjustably pivoted on said frame, each linkage comprising a connecting plate rotatably mounted on the shaft for the intermediate gear, a drill spindle extending through the other end of the connecting plate with the intermediate gear and the drill gear meshed with each other, a holding arm having one end pivotally mounted on a drill spindle and having an elongated slot therein, and securing means on said frame extending through the slot for adjustably pivotally securing the holding arm to the frame at various positions along the length of the slot, whereby the positions of said intermediate gears can be adjusted along the circular path around the central gear and the individual drill spindles can each be adjusted in a circular path around the intermediate gears so that a particular drill spindle can be positioned anywhere within a circular band around the central gear the inside diameter of which is defined by the positions of the drill spindles when they are radially inwardly of the intermediate gears and the outside diameter of which is defined by the positions of the drill spindles when they are radially outwardly of the intermediate gears.

References Cited by the Examiner

UNITED STATES PATENTS

| 1,148,094 | 7/15 | Kern | 77—24 |
| 1,191,915 | 7/16 | Weaver | 77—23 |
| 1,246,250 | 11/17 | Eisler | 77—24 |
| 2,186,294 | 1/40 | Handling et al. | 77—23 |
| 2,293,991 | 8/42 | Linderme | 77—24 |

FOREIGN PATENTS

| 22,255 | 2/48 | Finland. |
| 127,670 | 2/02 | Germany. |

WILLIAM W. DYER, Jr., *Primary Examiner.*

FRANCIS S. HUSAR, *Examiner.*